United States Patent [19]

Hermant

[11] Patent Number: 4,947,644
[45] Date of Patent: Aug. 14, 1990

[54] DIVERGING PORTION OF DISCONTINUOUS CURVATURE FOR A ROCKET ENGINE NOZZLE

[75] Inventor: Eric Hermant, Vernon, France

[73] Assignee: Societe Europeenne De Propulsion, Suresnes, France

[21] Appl. No.: 213,345

[22] Filed: Jun. 30, 1988

[30] Foreign Application Priority Data

Jul. 20, 1987 [FR] France .................. 87 10243

[51] Int. Cl.$^5$ .......................... F02K 1/28; B63H 25/46
[52] U.S. Cl. ........................................ 60/257; 60/264; 60/271; 239/265.17
[58] Field of Search ................ 60/264, 271, 265, 257; 239/265.17, 127.3, 265.19

[56] References Cited

U.S. PATENT DOCUMENTS

| | | |
|---|---|---|
| 2,900,789 | 8/1959 | Philpot .......................... 239/127.3 |
| 3,231,197 | 1/1966 | Strom ............................ 239/265.17 |
| 3,469,787 | 9/1969 | Marsh et al. . |
| 3,563,467 | 2/1971 | Marsh et al. . |
| 3,612,546 | 1/1973 | Kaufmann . |
| 3,711,027 | 1/1973 | Carey .............................. 60/271 |
| 4,162,040 | 7/1979 | Carey .............................. 60/271 |
| 4,220,001 | 9/1980 | Beichel ........................... 60/271 |
| 4,349,155 | 9/1982 | Donguy ........................... 60/271 |
| 4,638,632 | 1/1987 | Wulf et al. ...................... 60/264 |
| 4,754,926 | 7/1988 | Singer ............................. 60/271 |
| 4,815,279 | 3/1989 | Chang ............................. 60/264 |

FOREIGN PATENT DOCUMENTS

| | | |
|---|---|---|
| 537785 | 5/1955 | Belgium . |
| 1019867 | 11/1957 | Fed. Rep. of Germany . |
| 1951424 | 4/1971 | Fed. Rep. of Germany . |
| 2088412 | 3/1971 | France . |
| 353631 | 4/1961 | Switzerland . |

Primary Examiner—Donald E. Stout
Attorney, Agent, or Firm—Marshall & Melhorn

[57] ABSTRACT

The diverging portion of discontinuous curvature is fitted with a controlled injection device for controlled injection of an additional jet of gas into the diverging portion in the same direction as the main flow of gas ejected by the nozzle, and said controlled injection device is disposed outside the diverging portion in the vicinity of the join zone between the first and second lengths in order to inject a determined flow of said additional gas into the diverging portion along a direction which is not tangential to the wall of the diverging portion.

23 Claims, 3 Drawing Sheets

DIVERGING PORTION OF DISCONTINUOUS CURVATURE FOR A ROCKET ENGINE NOZZLE

The present invention provides a diverging portion with curvature discontinuity for the nozzle of a rocket engine, the diverging portion comprising, starting from the throat of the nozzle, a first length constituted by a first surface of revolution about the nozzle axis and having a curved profile in axial section, and a second length constituted by a second surface of revolution about the nozzle axis and also having a curved profile in axial section, said first and second lengths defining a curvature discontinuity in a join zone where they meet.

BACKGROUND OF THE INVENTION

Optimum rocket engine performance is obtained when the outlet pressure from the diverging portion is equal to ambient pressure. This leads to the ratio between the cross-sectional area of the nozzle throat and the outlet cross-sectional area of the diverging portion to be fixed in such a manner as to match the outlet pressure from the diverging portion to ambient pressure.

For conventional diverging portions having a fixed area ratio and for use with rocket engines operating from the ground, the area ratio is determined for proper operation at ground level. As a result performance falls off at altitude, since the external pressure falls off and is no longer matched to the outlet pressure from the diverging portion which remains constant.

In order to improve the average performance over the duration of a flight, and in particular performance at high altitude, proposals have already been made to provide diverging portions of variable area ratio, such as extensible diverging portions in the form of truncated cones or having single curvature, as described, for example, in patent specification No. FR-A-2 457 390. Proposals have also been made to use fixed diverging portions with discontinuous curvature.

The use of a single curvature extensible diverging portion on a rocket engine suffers from constraints related to engine architecture in addition to any possible problems relating to the unfolding system per se. With a single curvature extensible diverging portion, the moving portion which is retracted around the engine in the folded starting position is very long and has a small inside diameter. This imposes very strict constraints on architecture right up to the top of the engine.

The principle of a fixed diverging portion with discontinuous curvature is to have a jet that breaks away at the discontinuity in curvature while on the ground, i.e. the jet ceases to follow the diverging wall and a dead zone is thus set up between the jet and the wall. Thereafter, as altitude increases and as external pressure falls off, the jet becomes reattached to the bottom portion of the diverging portion, thereby increasing the apparent area ratio of the jet and thus improving its performance at altitude. Nevertheless, this system suffers from drawbacks relating both to stability and to performance. It is very difficult to ensure that the jet detaches cleanly on the ground or at low altitude and then that it becomes reattached both symmetrically and stably at higher altitude. Further, the discontinuity in the curvature gives rise, after the jet has become reattached, to an increase in the boundary layer and thus to a loss in performance.

The present invention seeks to remedy the above drawbacks and to enable the outlet section area of a fixed or extensible type of diverging portion to be properly matched without giving rise to severe architectural constraints nor to a substantial limit on performance or stability in the operation of the rocket engine.

The invention also seeks to improve the operation of unfolding a diverging portion of the extensible type.

SUMMARY OF THE INVENTION

These objects are achieved by a diverging portion of discontinuous curvature of the type defined at the beginning of the description, and fitted with a controlled injection device for controlled injection of an additional jet of gas into the diverging portion in the same direction as the main flow of gas ejected by the nozzle, with said controlled injection device being disposed outside the diverging portion in the vicinity of the join zone between the first and second lengths in order to inject a determined flow of said additional gas into the diverging portion along a direction which is not tangential to the wall of the diverging portion.

In a first embodiment, the controlled injection device includes means for recovering secondary gas flows used in the rocket engine or taken from the rocket stage which is fitted with the rocket engine.

In another embodiment, the controlled injection device includes an independent source of gas under pressure.

The controlled injection device may be adapted to allow the additional gas jet to be injected only during a fraction of the rocket engine operating time.

Advantageously, the diverging portion of discontinuous curvature in accordance with the invention is of the extensible type. In this case, it is advantageous for the controlled injection device also to constitute a system for initiating the unfolding of the second extensible length of the diverging portion.

BRIEF DESCRIPTION OF THE DRAWINGS

Embodiments of the invention are described by way of example with reference to the accompanying drawings, in which.

MORE DETAILED DESCRIPTION

Figure 1:
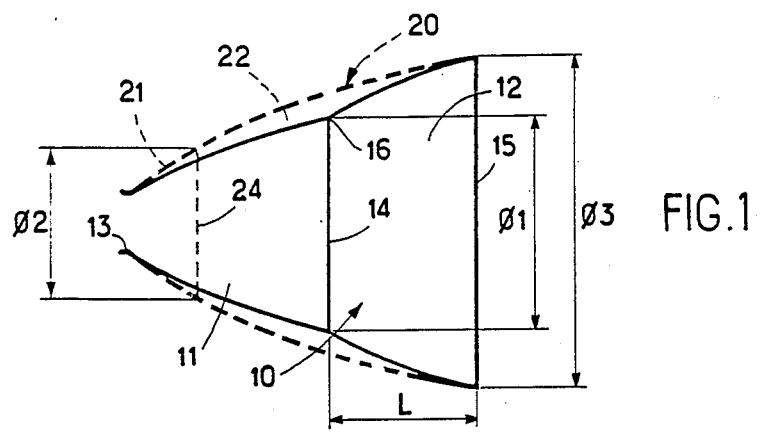
FIG. 1 comprises a diagrammatic axial section of a diverging portion of discontinuous curvature to which the invention is applicable drawn in solid lines, and a prior art single curvature extensible diverging portion drawn in dashed lines.

Dashed lines in FIG. 1 show an example of a conventional extensible diverging portion 20 for the nozzle of a rocket engine, with the diverging portion 20 being of the single curvature type, i.e. its axial section has continuous curvature. The extensible diverging portion 20 has a nozzle throat 13 which is connected to a fixed first portion 21 having an outlet section 24 of diameter φ2. In the unfolded position shown in Fig. 1 and corresponding to opertion above a certain altitude, a second portion 22 extends the fixed portion 21 and defines an outlet section 15 of diameter φ3 which is much greater than the diameter φ2 corresponding to the outlet section 24 of the fixed portion 21. The moving portion 22 of the conventional extensible diverging portion 20 extends over a considerable length and it has a small diameter φ2 inlet section which must be an exact fit with the outlet section 24 of the fixed portion 21. In its initial folded position on leaving the ground, the long moving portion 22 must therefore be raised or folded back along the engine upstream from the fixed poriton 21 which is short and of small section, and this gives rise to considerable technical architecture problems. Further, by virtue of its great length, the moving portion 22 is of considerable mass and the unfolding system must be relatively powerful. FIG. 1 also shows in continuous lines a diverging portion 10 having discontinuous curvature in accordance with the present invention, which diverging portion may be fixed or extensible and is arranged in such a manner as to present the same outlet section 15 when operating at altitude as the diverging portion 20, i.e. having the same diameter φ3; the throat 13 of the nozzle is identical both in the single curvature diverging portion 20 and in the discontinuous curvature diverging portion 10.

It may be observed that in accordance with the present invention the first section 11 of the discontinuous curvature diverging portion 10 which is always fixed may be longer than the fixed portion 21 of the diverging portion 20, and may have an outlet section 14 which is larger than the outlet section 24 of the fixed portion 21 of the diverging portion 20. The fixed portion 11 of the discontinuous curvature diverging portion is optimized for operation at ground level so that the flow of gas does not become detached from the wall along the fixed portion 11. The downstream portion 12 which defines a curvature discontinuity relative to the fixed front portion 11 may be of relatively short length L, and it may be of relatively large section over its entire length, which does not give rise to major problems for making the downstream portion movable. Thus, in the starting position, the downstream portion 12 may easily be placed in a folded-back position around the fixed portion 11 and when unfolded the power required for unfolding purposes is limited.

The characteristics of the present invention explained below make it possible to guarantee optimized operation and to simplify the provision of a discontinuous curvature diverging portion, regardless of whether it is of the extensible type or of the fixed type.

Figure 2:
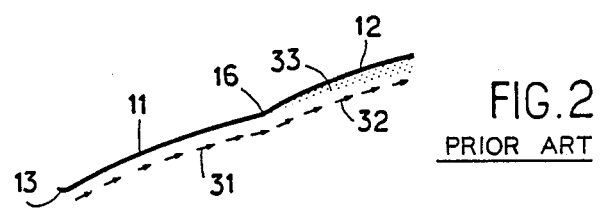
FIG. 2 is a fragmentary diagrammatic view in half axial section of a prior art diverging portion having discontinuous curvature and presenting a large boundary layer.

FIG. 2 shows that a large boundary layer 33 exists between the wall of the downstream portion 12 of a conventional fixed discontinuous curvature diverging portion and the downstream jet of gas 32 which is incapable, at high altitude, of attaching itself to the wall 12 as well as the upstream jet of gas 31 which, right from the start, is firmly attached to the upstream portion 11 of the diverging portion between the throat 13 of the nozzle and the zone 16 where the curvature changes.

Figure 3:
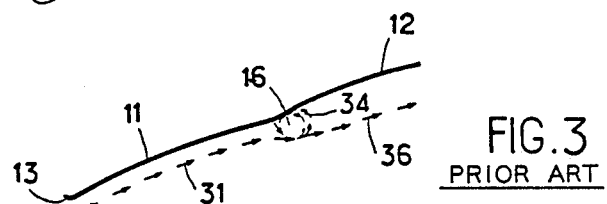
FIG. 3 is a fragmentary diagrammatic view in half axial section of another prior art diverging portion of discontinuous curvature and presenting a gas recirculation zone.

FIG. 3 shows how a conventional fixed discontinuous curvature diverging portion with a large change in slope between the upstream portion 11 and the downstream portion 12 gives rise to the jet of gas 31 becoming detached with an increase in external pressure, and to a zone 34 of gas recirculation in the vicinity of the zone 16 where the curvature changes, thereby preventing the jet of gas 36 from being able to reattach itself to the wall of the diverging portion in the downstream portion 12 thereof, even at high altitude.

Figure 4:
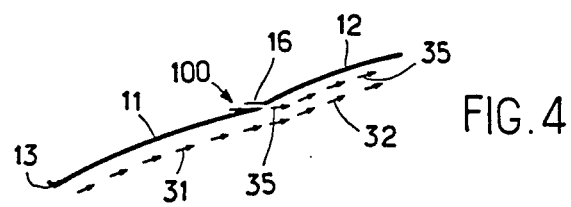
FIG. 4 is a fragmentary diagrammatic view in half axial section of a diverging portion of discontinuous curvature provided with a gas injection device in accordance with the invention.

FIG. 4 is a diagram showing means 100 for additional controlled injection of a jet of gas 35 into the zone 16 where the curvature of the diverging portion changes, thereby entraining the main jet of gas 32 reliably along the wall of the downstream portion 12 even if the change in slope is considerable. The boundary layer is then considerably reduced.

Thus, injecting gas at the curvature discontinuity serves to control the boundary layer, i.e. to ensure stable and symmetrical attachment of the gas jet on a fixed discontinuous curvature diverging portion starting from the predetermined instant at which the downstream portion 12 of the diverging portion is to be brought into operation. Thereafter, the boundary layer can be controlled continuously and the loss of performance in continuous operation can be reduced.

The presence of a gas injection device makes it possible to provide a downstream portion 12 of the diverging portion having a large change in slope relative to the upstream portion 11, thus making it possible to obtain an outlet section 15 of given diameter φ3 (FIG. 1) while using a downstream portion 12 whose length L is short, and whose mass is therefore low. In any event, there is no loss of performance nor is there any risk of the main jet of gas 32 becoming detached inopportunely since the additional gas injection 35 performed at the discontinuity in curvature 16 serves to blow away the detached zone, thereby sucking the main jet 32 towards the wall.

It may be observed that in accordance with the invention the additional gas injection is performed in controlled manner, i.e. with an adjustable flow rate at a determined angle of injection which produces an additional jet which is not tangential to the wall of the downstream portion 12 of the discontinuous curvature diverging portion 10.

The device 100 for injecting gas may be made in various different manners and, depending on the applications envisaged, it may be implemented, in particular, either intermittently or permanently.

Figure 5:
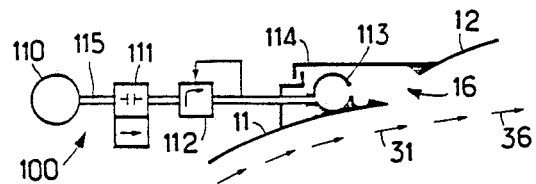
FIGS. 5 to 7 are diagrammatic views in half axial section of a diverging portion of discontinuous curvature provided with a gas injection device fitted with an independent tank of gas under pressure in accordance with a first embodiment of the invention, said figures respectively showing the diverging portion prior to a beginning of additional gas injection stage, during a beginning of additional gas injection stage, and after a beginning of additional gas injection stage.
Figure 6:
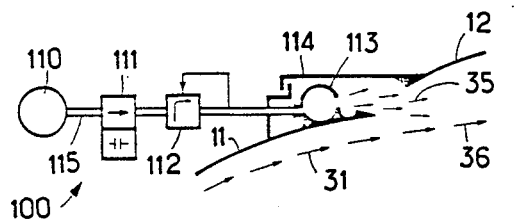
Figure 7:
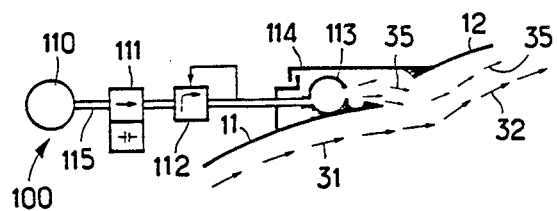

FIGS. 5 to 7 show a particular embodiment of a device 100 for controlled injection of additonal gas into the zone of discontinuous curvature in a diverging portion including a fixed upstream portion 11 and a downstream portion 12 which may be fixed or moving.

The device 100 shown is FIGS. 5 to 7 comprises a tank 110 of gas under pressure, and a supply line 115 which opens out via injectors 113 into the diverging portion at the zone 16 where the curvature changes. A valve 111 and an expander 112 are disposed on the line 115 in order to control the injection of additional gas. A shroud 114 made up of components which are fixed to the upstream portion 11 of the diverging portion or on the downstream portion 12 of the diverging portion serves to protect the injectors 113.

FIG. 5 shows the flow of the main gas jet 31 in the diverging portion in the absence of any additional gas being injected and in an initial stage during which the main gas jet moves away from the downstream wall 12 (jet 36). The valve 111 is then closed.

FIG. 6 related to the beginning of a stage during which additional gas 35 is injected, with the valve 111 being opened in order to force and facilitate reattachment of the main gas jet 31, 36 against the downstream wall 12 at a predetermined instant which corresponds to the rocket reaching a certain attitude and which, if the diverging portion is extensible, also corresponds to the downstream portion 12 being unfolded.

FIG. 7 shows the shape of the flow of the main gas jet 31, 32 after the reattachment stage, with the valve 11 remaining in the open position. The main jet 32 is stabilized along the wall of the downstream portion 12 by the flow of the secondary jet 35 which is initially injected by the injector 113 in a manner which is not tangential to the downstream portion 12.

Figure 8:
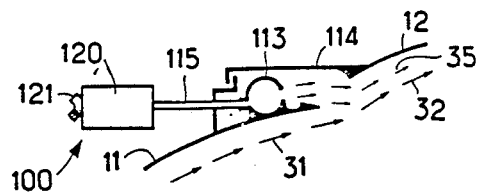
FIG. 8 is a diagrammatic half axial section of a diverging portion of discontinuous curvature provided with an additional gas injection device fitted with a gas generator in accordance with a second embodiment of the invention.

FIG. 8 shows another embodiment of the device 100 for controlled injection of additional gas, during the same operating stage as that shown in FIG. 7. In the case shown in FIG. 8, the gas storage system shown in FIGS. 5 to 7 has been replaced by a gas generator 120 comprising a block of colid fuel provided with a firing system 121 which is triggered at the instant when the main jet 31, 32 is to become reattached to the wall. The gas generator 120 could also be a liquid-fueled type, for example by catalytic decomposition of hydrazine, in which case it would operate without a firing system 121.

The devices 100 shown in FIGS. 5 to 8 for injecting gas have the advantage of being easy to operate in a non-permanent or variable manner. Optimization of the flow rate of additional gas 35 makes it possible to achieve the main object which may either be to maximize performance, or else to control reattachment of the main flow 31, 32.

The additional gas reinjected by the device 100 may be taken from separate devices as shown in FIGS. 5 to 8, or else it may be taken from a stage of the rocket on which the rocket engine is mounted. It is then possible by means of recovery devices to make use of a portion of the pressurization gas or high pressure gas stored in the tanks for controlling the valves.

The additional gas injected by the device 100 may also be taken from the rocket engine itself and be reinjected into the zone of discontinuous curvature in the diverging portion by using recuperation means. The gas from the rocket engine may be constituted by flows of exhaust gas from the turbines of the turbo pumps feeding the rocket engine, flows of cooling fluid (known as "dump flows"), or flows of gas bled-off from the combustion chamber. Recovering gas coming from the rocket engine implies that the device 100 for injecting additional gas opertes on a permanent basis, but nevertheless allows the flow rate reinjected into the zone of discontinuous curvature to be controlled.

Figure 9:
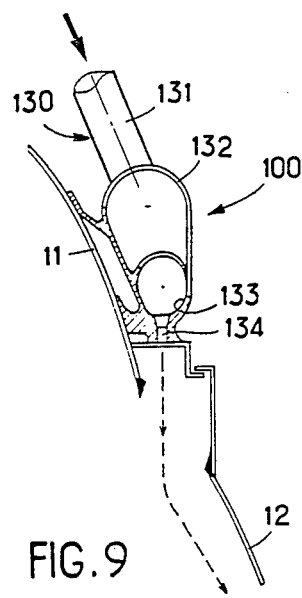
FIGS. 9 and 10 are diagrammatic views in half axial section of two different embodiments of a diverging portion of discontinuous curvature provided with an additional gas injection device including means for recovering secondary gas flows of the rocket engine.
Figure 10:
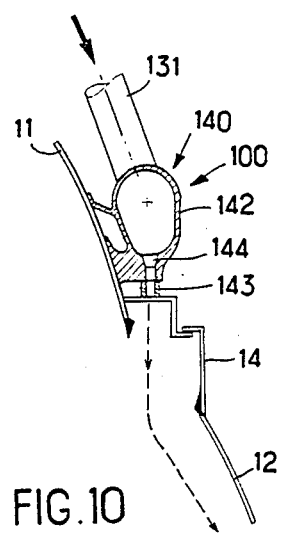

FIGS. 9 and 10 show two variant embodiments of means 130, 140 for recovering and reinjecting gas coming from the rocket engine, in particular turbine exhaust gas.

In FIG. 9, the device 100 for controlled injection of additional gas includes gas recovery means 130 including a volute 132 into which at least one tube 131 opens out from the exhaust of the turbine of one of the rocket-engine's turbo pumps. The volute 132 opens out into a torus 133 which communicates via injectors 134 with the inside of the diverging portion 10 and which enables additional gas to be injected along a predetermined direction which is initially non-tangential to the downstream portion 12. The use of a volute and a torus for injecting the turbine exhaust gases makes it possible to ensure good uniformity and good distribution of the gas on injection into the nozzle.

In FIG. 10, the gas recovery means 140 are slightly different from the gas recovery means 130 shown in FIG. 9, and comprise a single torus 142 into which at least one tube 131 opens out from the exhaust of the turbine, which torus communicates via injectors 144 and a network of tubes 143 with the inside of the diverging portion 10 in such a manner as to enable additional gas to be injected, as in the FIG. 9 case, along a predetermined direction which is initially not tangential to the downstream portion 12. This solution makes it possible to obtain gas recovery means 140 of reduced mass.

The first and second lengths 11 and 12 of the diverging portion 10 of discontinuous curvature advantageously constitute an extensible diverging portion which may be of the ring and petal type as described in French Pat. Specification No. FR-A-2 457 390, for example. In that case, the downstream length 12 begins to be unfolded after the rocket engine has been operating for a predetermined length of time which corresponds to a certain altitude.

It is preferable for the controlled injection device 100 to allow the additional jet of gas to be injected only after the rocket engine has been operating for a predetermined length of time which corresponds to initializing the unfolding of the second length.

Figure 11:
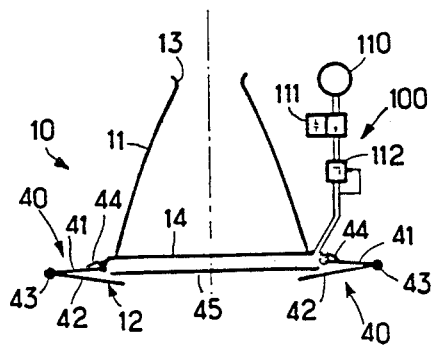
FIGS. 11 and 12 are diagrammatic views in axial section of a extensible diverging portion of discontinuous curvature fitted with an additional gas injection device in accordance with the invention and shown respectively with the extensible diverging portion folded and unfolded.
Figure 12:
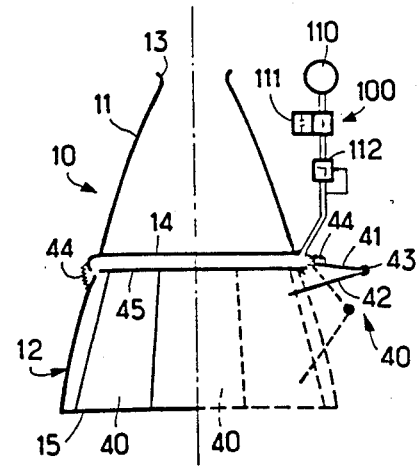

Advantageously, switching on the controlled injection device 100 contributes to triggering unfolding of the extensible downstream length 12, while the main jet serves to provide the necessary energy for full unfolding of the petals 40 which constitute the downstream length 12 of the diverging portion (FIGS. 11 and 12).

After the downstream length 12 has been unfolded and additional gas has been injected by the device 100 in order to cause the main jet of gas to reattach itself to the wall of the downstream portion 12, the injection of additional gas by the device 100 may be switched off. The most critical period from the point of view of controlling the behavior of the main gas jet at the curvature discontinuity is the stage during which the downstream length 12 is being unfolded. However, it is useful to continue gas injection either at a fixed or at a variable rate after the downstream length 12 has been unfolded in order to accurately control the boundary layer and thus contribute to improving the performance of the rocket engine.

FIGS. 11 and 12 show a discontinuous curvature diverging poriton with its downstream length 12 in a folded position during a first operating stage (FIG. 11) and unfolded during a second operating stage (FIG. 12).

FIGS. 11 and 12 show a downstream length 12 constituted by a set of elements 40 or petals, each of which comprises a flap 42 connected at one end by a hinge 43 to one end of another flap 41 which is in turn connected by a hinge 44 to the bottom end of the fixed upstream length 11 of the diverging portion 10. Rings 45 serve to fix the various petals to one another. Naturally, each petal 40 could comprise a number of flaps 41, 42 other than two folded concertina-like, e.g. three successive flaps.

In FIGS. 11 and 12 the device 100 for injecting the jet of additional gas is shown as corresponding to the embodiment of FIGS. 5 to 7, however other embodiments, e.g. that shown in FIG. 8, could also be used. When the device 100 combines the functions of triggering unfolding of the elements 40 making up the downstream portion 12 of the diverging portion, and of forcing the main gas jet to attach itself against the downstream portion 12 of the diverging portion 10, it suffices for said controlled injection device 100 to be prevented from authorizing the injection of additional gas until after a predetermined period of rocket engine operation.

I claim:

1. A diverging portion with curvature discontinuity for the nozzle of a rocket engine through which a main flow of gas is ejected, the diverging portion comprising a first length constituted by a first surface of revolution about the nozzle axis and having a curved profile in axial section, a second length constituted by a second surface of revolution about the nozzle axis and having a curved profile in axial section, the curvature discontinuity defined in the zone where said first length and said second length meet, and a controlled injection device disposed to inject a controlled quantity of an additional gas into the diverging portion in the same direction as the main flow of gas ejected by the nozzle, the additional gas injected in a direction non-tangential to the surface of the diverging portion, wherein said controlled injection device injects a substantial quantity of additional gas into the diverging portion only after the rocket engine has been operated for a predetermined length of time.

2. A diverging portion according to claim 1, wherein the first and second lengths are interconnected in fixed manner in an unfolded position throughout the duration of rocket engine operation.

3. A diverging portion according to claim 1, wherein the first and second lengths constitute an extensible diverging portion, and wherein the second length is unfolded only after the rocket engine has operated for a predetermined length of time.

4. A diverging portion according to claim 1, wherein the controlled injection device allows the additional jet of gas to be injected only during a limited period of time which is interrupted before the end of rocket engine operation.

5. A diverging portion according to claim 1, wherein the controlled injection device includes secondary gas flow recovery means for recovering secondary gas used in the rocket engine.

6. A diverging portion according to claim 5, wherein said secondary gas flow recovery means comprise a volute and an admission torus.

7. A diverging portion according to claim 5, wherein said secondary gas flow recovery means include a network of tubes.

8. A diverging portion according to claim 5, wherein the secondary gas comprises exhaust gas from the turbines of the rocket engine feed turbo pumps.

9. A diverging portion according to claim 5, wherein the secondary gas comprises cooling fluid.

10. A diverging portion according to claim 5, wherein the secondary gas comprises gas bled from the combustion chamber.

11. A diverging portion according to claim 1, wherein the controlled injection device includes secondary gas flow recovery means for recovering secondary gas bled from the stage of the rocket fitted with the rocket engine.

12. A diverging portion according to claim 11, wherein the secondary gas comprises pressurization gas.

13. A diverging portion according to claim 12, wherein the secondary gas flow recovery means comprises a volute and an admission torus.

14. A diverging portion according to claim 11, wherein the secondary gas comprises gas stored at high pressure in tanks for driving valves.

15. A diverging portion according to claim 14, wherein the secondary gas flow recovery means comprises a volute and an admission torus.

16. A diverging portion according to claim 11, wherein the secondary gas flow recovery means comprises a volute and an admission torus.

17. A diverging portion according to claim 11, wherein the secondary gas flow recovery means includes a network of tubes.

18. A diverging portion according to claim 1, wherein the controlled injection device includes an independent source of gas under pressure.

19. A diverging portion according to claim 18, wherein the independent source of gas under pressure is constituted by a tank of high pressure gas, and wherein the controlled injection device includes a feed line fitted with a valve and with an expander for connecting the high pressure gas tank to injectors disposed on the diverging portion in the vicinity of the zone where the first and second lengths meet with curvature discontinuity.

20. A divergin portion according to claim 18, wherein the independent source of gas under pressure includes a solid-or liquid-fueled gas generator.

21. A diverging portion with curvature discontinuity for the nozzle of a rocket engine through which a main flow of gas is ejected, the diverging portion comprising a first length constituted by a first surface of revolution about the nozzle axis and having a curved profile in axial section, a second length constituted by a second surface of revolution about the nozzle axis and having a curved profile in axial section, said curvature discontinuity defined in the zone where said first length and said second length meet, and a controlled injection device disposed to inject a controlled quantity of an additional gas into the diverging portion in the same direction as the main flow of gas ejected by the nozzle, the additional gas injected in a direction non-tangential to the surface of the diverging portion, wherein the first length and the second length constitute an extensible diverging portion, the second length unfolds only after the rocket engine has operated for a predetermined length of time, the controlled injection device includes secondary gas flow recovery means for recovering secondary gas bled from the stage of the rocket fitted with the rocket engine, the controlled injection device allows the additional gas to be injected only after the rocket engine has operated for a predetermined length of time, and the controlled injection device further constitutes a system for initiating the unfolding of the second extensible length of the diverging portion.

22. A diverging portion according to claim 21, wherein the secondary gas comprises pressurization gas.

23. A diverging poriton according to claim 21, wherein the secondary gas comprises gas stored at high pressure in tanks for driving valves.

* * * * *